March 27, 1928.  1,663,650

C. FROESCH

VENTILATING SYSTEM

Filed March 24, 1927  2 Sheets-Sheet 1

INVENTOR
Charles Froesch
BY Redding, Greeley, O'Shea & Campbell
his ATTORNEYS

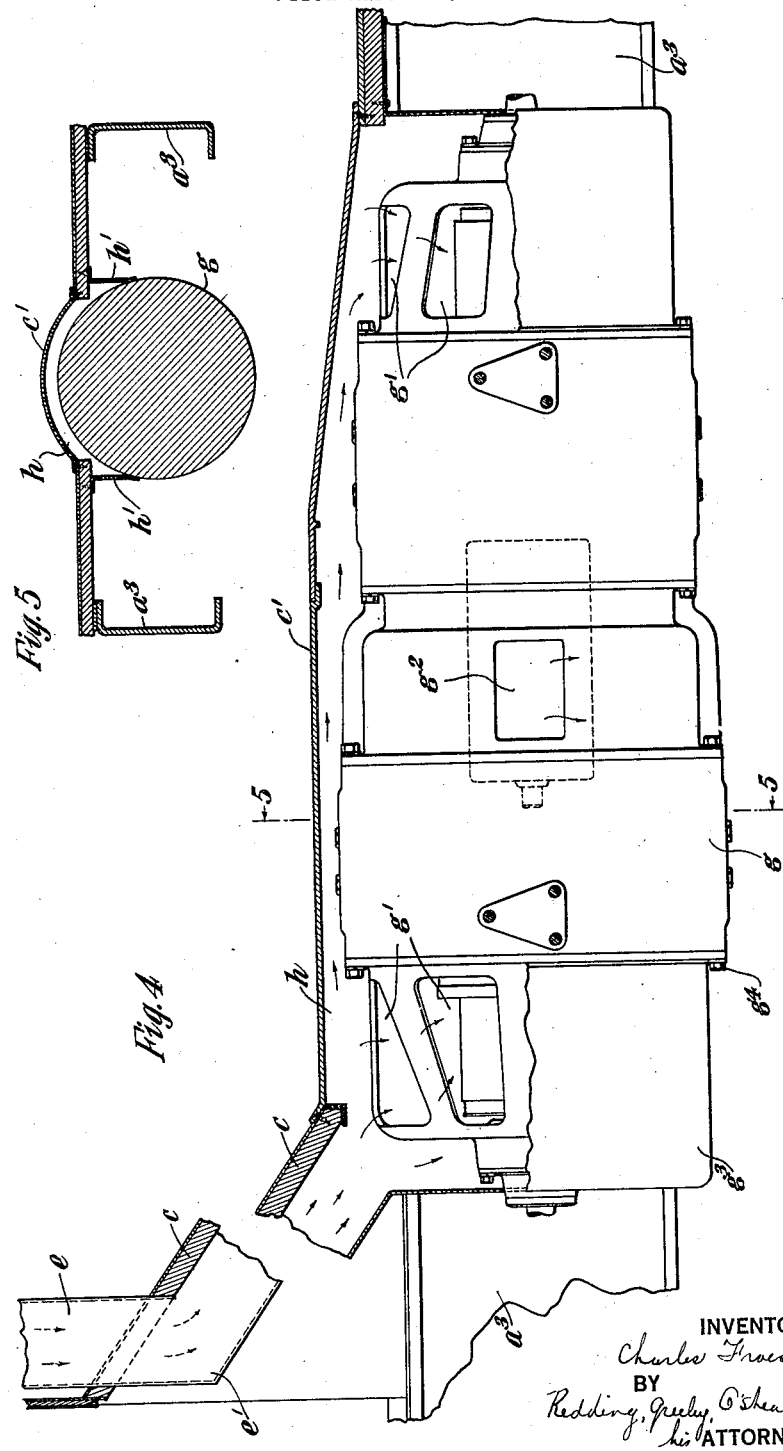

Patented Mar. 27, 1928.

1,663,650

UNITED STATES PATENT OFFICE.

CHARLES FROESCH, OF NEW YORK, N. Y., ASSIGNOR TO INTERNATIONAL MOTOR COMPANY, OF NEW YORK, N. Y., A CORPORATION OF DELAWARE.

VENTILATING SYSTEM.

Application filed March 24, 1927. Serial No. 177,877.

The present invention relates to ventilating systems for motor vehicles wherein the vehicle structure includes parts which generate heat and cause adjacent sections of the body to be heated therefrom. Due to features of design which must necessarily be embodied in the construction of the vehicle, it frequently happens that certain sections receive an unusally large amount of heat which is not readily dissipated and as a result discomfiture to the passengers is caused. A greater evil from this condition lies in the fact that excessive heating is detrimental to the life of the winding insulation.

The first mentioned disadvantage is particularly true where the front floor boards are near the engine, or, in case of gas-electric drives, where the motor generator sets are adjacent the floor boards. In these instances it is quite desirable to prevent excess heating of the floor boards and the present invention seeks to provide a means for carrying off the heat thus generated and ventilate the space under the floor board and between the side frame members.

More specifically, the invention comprises the provision of vertical ducts from the floor to the top of the cowl so that air can circulate from the space under the floor board directly to the outside, or, when the vehicle is in motion, from the outside, through the ducts and around the adjacent parts.

A further object is to provide a means for supplying clean air at all times to the motor generator set of a gas-electric drive, the air serving, additionally, as a ventilating means for the space under the floor boards as described above.

Further and other objects will appear as the description proceeds and reference will now be had to the accompanying drawings for a more detailed description of the invention, wherein:

Figure 4 is a view, partly in section, showing the use of the present invention to provide an effective means for ventilating the motor generator unit of a gas-electric drive.

Figure 5 is a section taken on line 5—5 of Figure 4.

Figure 1:
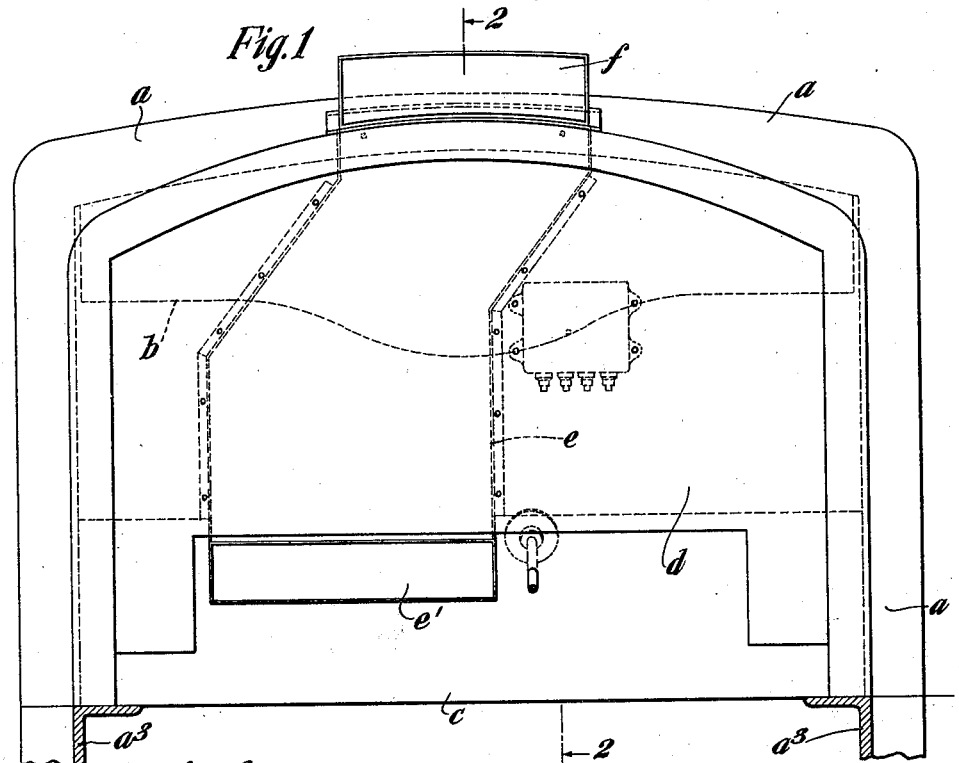
Figure 1 is a front elevation, looking rearwardly from the engine, and showing the vertical air duct provided in the dash.
Figures 2, 3:
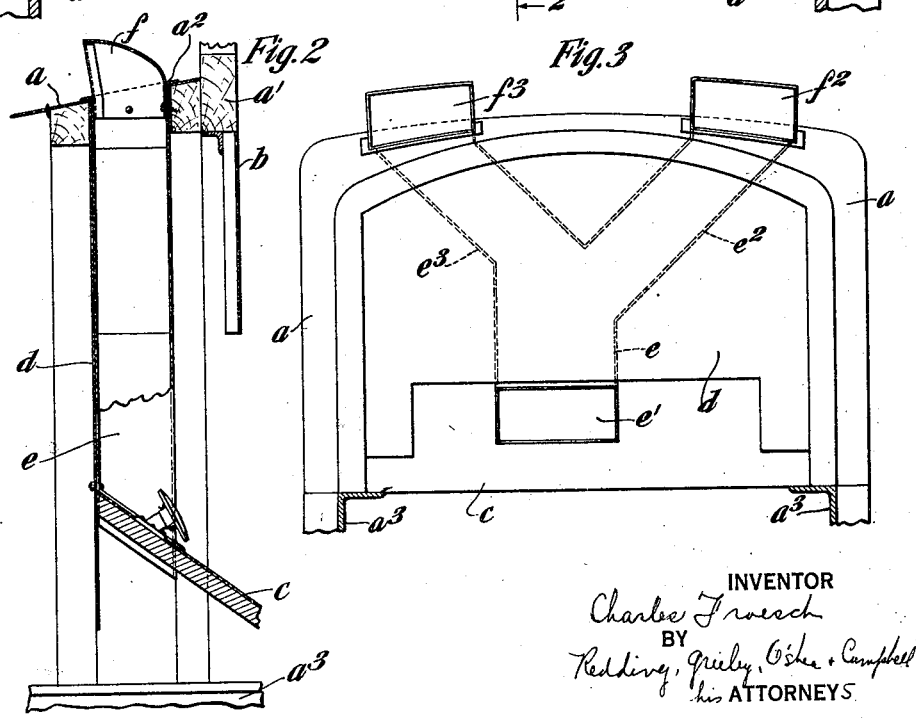
Figure 2 is a section taken on lines 2—2 of Figure 1 and looking in the direction of the arrows.
Figure 3 is a view similar to Figure 1 but showing a modified form of the invention.

Referring particularly to Figures 1 and 2, $a$ indicates the cowl of the vehicle, mounted on side channels $a^3$ and having an upright $a'$ and a dash board $b$ to receive the instruments. The floor is indicated at $c$ and between the floor and cowl the dash $d$ extends. Carried by the dash and extending between the floor and cowl, is a duct $e$ which communicates with the space under the floor and between the side channels as at $e'$. In the form shown, the duct is offset angularly to avoid interfering with the usual mechanism carried by the dash, and at the upper portion of the duct, a hood $f$ is provided to deflect the air into the duct when the vehicle is moving forward. The offset of the cowl duct additionally effects good ventilation on the exhaust pipe side of the chassis which is always the hottest and radiates the greatest amount of heat. This hood is carried in a suitable aperture $a^2$ in the vehicle cowl.

It will be seen from the above decription that when the vehicle is moving forward, the air will be deflected into the duct $e$ and carried to the space below the floor and between the side frame members, thus vetilating them quite effectively. The pocket formed by these members and the floor board will be relieved of the continuous supply of heated air from the engine or driving units and better operation results. When the vehicle is starting and the engine is idling the thermal effect between the relatively hot and cool gases causes the heated air to rise through the duct and thus ventilate the above space under such conditions.

In Figure 3, the duct $e$ is provided with two branches $e^2$ and $e^3$, each having separate hoods $f^2$ and $f^3$, respectively, and in this construction the ventilating effect is more pronounced.

Referring more particularly to Figures 4 and 5, $g$ indicates a motor generator set of a gas-electric drive unit having air inlet vents $g'$ at either end thereof and central exhaust vents $g^2$. The duct $e$ is extended downwardly and in proximity to the drive unit described above. The floor is raised as at $c'$ to accommodate the unit and provide greater clearance and at either ends of the unit, suitable caps $g^3$ are provided to enclose the air ducts $g'$. In order to conduct the ventilating medium to the unit, the floor may be utilized as one wall of an enclosure $h$ including the upper portion of the unit and having suitable side walls $h'$. The duct $e$ communicates with this enclosure and the end caps $g^3$ introduce the medium into the drive unit. The end caps may be secured under the bolts $g^4$ which secure the end plates to the housings and any suitable means, such as riveting, may be used to connect the various sections of air ducts together.

The above structure insures a constant supply of clean air to the unit and avoids the accumulation of water, dirt and mud in the gas-electric drive unit, as found when it receives air from beneath the body. It also prevents the air which has been heated by refraction from the pavement from being used for ventilating the unit.

Obviously the invention may be embodied in other designs and forms and it is not to be limited save as defined in the appended claims.

What I claim is:

1. In a vehicle, side frame members and flooring carried therewith, a driving unit between the members and below the flooring a duct, means cooperating with the flooring for forming an enclosure for a portion of the unit and means to cause the duct to carry ventilating air from the exterior of the vehicle and above the frame members to the enclosure, whereby the ventilation of the unit by means of such air is effected.

2. In a vehicle, side frame members and flooring carried therewith, a driving unit between the members and below the flooring, a duct, means cooperating with the flooring for forming enclosures for portions of the unit, means to cause the duct to carry ventilating air from the exterior of the vehicle and above the frame members to the enclosures and means to deflect air into the duct.

This specification signed this 19th day of March A. D. 1927.

CHARLES FROESCH.